(12) United States Patent
Karle (10) Patent No.: US 12,188,654 B2
(45) Date of Patent: Jan. 7, 2025

(54) REFLECTOR, SUPPORTING STRUCTURE FOR REFLECTOR AND LIGHTING DEVICE

(71) Applicant: Stefan Karle, Munich (DE)

(72) Inventor: Stefan Karle, Munich (DE)

( * ) Notice: Subject to any disclaimer, the term of this patent is extended or adjusted under 35 U.S.C. 154(b) by 0 days.

(21) Appl. No.: 17/960,317

(22) Filed: Oct. 5, 2022

(65) Prior Publication Data
US 2023/0107653 A1     Apr. 6, 2023

(30) Foreign Application Priority Data

Oct. 5, 2021 (DE) .......................... 102021125864.2
Sep. 12, 2022 (DE) .......................... 102022123196.8

(51) Int. Cl.
| | |
|---|---|
| *F21V 7/04* | (2006.01) |
| *F21V 7/00* | (2006.01) |
| *F21V 7/18* | (2006.01) |
| *F21V 17/00* | (2006.01) |
| *F21V 17/10* | (2006.01) |
| *F21K 9/237* | (2016.01) |

(52) U.S. Cl.
CPC ............ *F21V 7/048* (2013.01); *F21V 7/0075* (2013.01); *F21V 7/18* (2013.01); *F21V 17/007* (2013.01); *F21V 17/104* (2013.01); *F21K 9/237* (2016.08)

(58) Field of Classification Search
CPC .................................. F21K 9/237; G03B 15/07
See application file for complete search history.

(56) References Cited

U.S. PATENT DOCUMENTS

| | | | | |
|---|---|---|---|---|
| 3,873,821 A | * | 3/1975 | Larson | ...................... F21V 7/18 |
| | | | | 135/33.5 |
| 4,527,166 A | * | 7/1985 | Luly | ...................... F24S 23/715 |
| | | | | 343/915 |
| 8,833,951 B1 | | 9/2014 | Pavlenko | |

(Continued)

FOREIGN PATENT DOCUMENTS

| | | |
|---|---|---|
| CN | 210954564 U | 7/2020 |
| GB | 2408316 A | 5/2005 |

(Continued)

OTHER PUBLICATIONS

Combined Search and Examination Report for corresponding UK application No. 2214422.4 dated Feb. 17, 2023.

(Continued)

*Primary Examiner* — Zheng Song
(74) *Attorney, Agent, or Firm* — Butzel Long (57) ABSTRACT

A lighting device, comprising a funnel-shaped reflector including a plurality of first rods, a flexible material attached to the plurality of first rods, and a plurality of first connectors, wherein each of the plurality of first connectors is attached to the reflector at a position adjacent to one of the plurality of first rods; and a supporting structure configured to support at least one light source and including at least one socket, and a plurality of second rods, wherein each of the plurality of second rods has a first end attached to the at least one socket; and wherein a second end of each of the plurality of second rods is releasably connected to one of the first connectors, so that the connection position of the second end of each of the plurality of second rods and the correspondingly connected first connectors is adjustable.

19 Claims, 6 Drawing Sheets

(56) References Cited

U.S. PATENT DOCUMENTS

| | | | |
|---|---|---|---|
| 10,203,083 B2* | 2/2019 | Lin | F21V 1/06 |
| 10,268,105 B1* | 4/2019 | Zhu | F21V 7/0008 |
| 2005/0088836 A1* | 4/2005 | Lowe | G03B 15/06 |
| | | | 362/18 |
| 2010/0177520 A1* | 7/2010 | Briese | G02B 5/10 |
| | | | 362/347 |
| 2010/0188752 A1* | 7/2010 | Briese | G03B 15/06 |
| | | | 359/599 |
| 2014/0071697 A1* | 3/2014 | Portmann | F21V 7/18 |
| | | | 362/319 |
| 2015/0168812 A1* | 6/2015 | Ortiz-Gavin | G03B 15/06 |
| | | | 362/18 |
| 2015/0184825 A1 | 7/2015 | Chen | |
| 2019/0377242 A1 | 12/2019 | Boerup | |
| 2021/0349375 A1* | 11/2021 | Nykolyshyn | F21V 7/18 |

FOREIGN PATENT DOCUMENTS

| | | |
|---|---|---|
| GB | 2425589 A | 11/2006 |
| JP | H05298910 | 11/1993 |
| WO | 2019048908 A1 | 3/2019 |

OTHER PUBLICATIONS

Office Action, with translation thereof, for corresponding DE application No. 10 2021 125 639.9 dated Jan. 13, 2022.
Office Action issued in App. No. GB2214422, dated May 13, 2024, 4 pages.
Korean Office Action (including English translation) issued in App. No. KR1020220126147, dated Sep. 4, 2024, 26 pages.

* cited by examiner

REFLECTOR, SUPPORTING STRUCTURE FOR REFLECTOR AND LIGHTING DEVICE

CROSS-REFERENCE TO RELATED APPLICATIONS

This application claims the priority benefit of German Application No. 102021125864.2, filed Oct. 5, 2021 and German Application No. 102022123196.8, filed Sep. 12, 2022, the disclosure of each of which is incorporated by reference in its entirety.

BACKGROUND

Nowadays, light sources having LED lights are heavily used for illumination purposes. These light sources are available in a large variety of formats differing with respect to the number of LED lights per unit area and with respect to the lengths and widths of the areas providing the LED lights.

BRIEF DESCRIPTION OF THE DRAWINGS

Embodiments of the invention will be illustrated with reference to the figures below. Specifically.

DETAILED DESCRIPTION

The invention relates to a funnel-shaped reflector, a supporting structure for such reflector and a lighting device formed of the supporting structure and the reflector. The invention relates also to a method of using a lighting device.

Herein, the invention relates to lighting devices which can be used for illumination purposes. An example of such lighting device is a softbox having a funnel-shaped reflector which can be used for illumination in film locations, for example.

A lighting device known from GB 2 425 589 A has a funnel-shaped reflector which includes an adjustable connection ring for attachment to light sources of different sizes.

It is desirable to be able to use a given reflector with various light sources, and to use a given light source with various types of reflectors.

The technology known from GB 2 425 589 A does not offer a sufficient flexibility to be able to combine the large number of different available light sources with different types of reflectors.

Accordingly, it is an object of the present invention to provide a reflector and a supporting structure for the reflector which are adaptable to various types of light sources. It is also an object of the present invention to provide a method of using a lighting device which facilitates a daily use of such lighting device for different locations.

According to embodiments of the invention, a lighting device comprises a funnel-shaped reflector and a supporting structure configured to support at least one light source and configured to apply a supporting force to the funnel-shaped reflector to prevent the reflector from collapsing.

According to some embodiments, the connection between the supporting structure and the reflector is flexible such that supporting structures of different sizes can be used with a same reflector. Therefore, a supporting structure of a size which can be used together with a desired light source can be selected, and this selected supporting structure can be used together with a given reflector due to the flexible configuration of the connection between the reflector and the supporting structure.

According to some embodiments, a lighting device is formed of a funnel-shaped reflector and a supporting structure. The funnel-shaped reflector includes a plurality of first rods, a flexible material attached to the plurality of first rods, and a plurality of first connectors, wherein each of the plurality of first connectors is attached to the reflector at a position adjacent to one of the plurality of first rods. The supporting structure is configured to support at least one light source and includes at least one socket, and a plurality of second rods. The second rods each have first and second ends. The first end of each second rod is attached to the at least one socket, and the second end of each second rod is releasably connected to one of the first connectors, so that the connection position of the second end of each of the plurality of second rods and the correspondingly connected first connectors is adjustable.

A central axis can be assigned to the supporting structure. If the supporting structure is attached to the funnel-shaped reflector, this central axis will approximately coincide with a central axis which can be assigned to the funnel-shaped reflector. According to some embodiments, the plurality of second rods extend away from the central axis, and the second ends of the plurality of second rods are distributed around the central axis. When the funnel-shaped reflector and the supporting structure are connected, the second rods can be elastically deformed to apply a supporting force to the first rods of the funnel-shaped reflector such that the supporting force prevents the reflector from collapsing.

According to some embodiments, the supporting structure includes at least one pivotable rod, wherein the first end of the pivotable rod is hinged to the socket such that the pivotable rod is pivotable relative to the socket in a circumferential direction about the central axis. Herein, the pivoting of the second rod in a direction orthogonal to the circumferential direction about the central axis can be blocked. The pivotable rod increases the flexibility of combining the supporting structure with various types of funnel-shaped reflectors.

According to some embodiments, the supporting structure comprises a plurality of sockets, wherein the supporting structure has a variable size such that distances between pairs of the plural sockets are adjustable. Such embodiment allows to adapt a given supporting structure to various sizes of light sources. Moreover, the flexible connection between the first and second rods allows to use a same reflector and a same supporting structure adapted to various sizes of light sources.

According to some embodiments, the first connectors each extend along one of the first rods over a length greater than 0.30 times a length of the first rod, or 0.45 times the length of the first rod or 0.60 times the length of the first rod. The extended arrangement of the first connectors offers flexibility to attach the second ends of the second rods of the supporting structure of various sizes.

Each of the first connectors may comprise a plurality of pockets distributed along a portion of a first rod, wherein the second end one of the second rods can be inserted into one of these pockets.

According to some embodiments, each of the first connectors is located with a first distance to the first end of one of the first rods, wherein the first distance is greater than 0.05 times the length of one the first rods, in particular greater than 0.1 times the length of one of the first rods, and in particular greater than 0.15 times the length of one of the first rods.

According to some embodiments, each of the first connectors is located with a second distance to the second end of one of the first rods, wherein the second distance is greater than 0.05 times the length of one the first rods, in particular greater than 0.1 times the length of one of the first rods, and in particular greater than 0.15 times the length of one of the first rods.

Such configurations can not only save some materials of the first connectors compared to the case, in which each of the first connectors has to extend along the whole length of one of the first rods, but more importantly enhance the adaptability of the first connectors. More specifically, the first connectors do not have to be located either at the first end or at the second end of the first rods.

According to some embodiments, the supporting structure includes second connectors attached to the second ends of the second rods, wherein the second connectors are configured to connect to the first connectors. For example, the first and second connectors can be the hook portion and/or the respective loop portion of a hook-and-loop-fastener.

According to some embodiments, a method of using a lighting device comprises extracting a reflector and a supporting structure from a portable bag, wherein the reflector includes a plurality of first rods, a flexible material attached to the plurality of first rods and a plurality of first connectors, wherein each of the plurality of first connectors is attached to the reflector at a position adjacent to one of the plurality of first rods, and wherein the supporting structure configured to support at least one light source includes at least one socket and a plurality of second rods; mounting the lighting device by attaching a first end of each of the plurality of second rods to the at least one socket; attaching a second end of each of the plurality of second rods to one of the plurality of first connectors; operating the at least pone light source; dismounting the lighting device by releasing the second end of each of the plurality of second rods from the corresponding one of the plurality of first connectors; releasing the first end of each of the plurality of second rods from the at least one socket; and inserting the reflector and the supporting structure into the portable bag.

Figure 1:
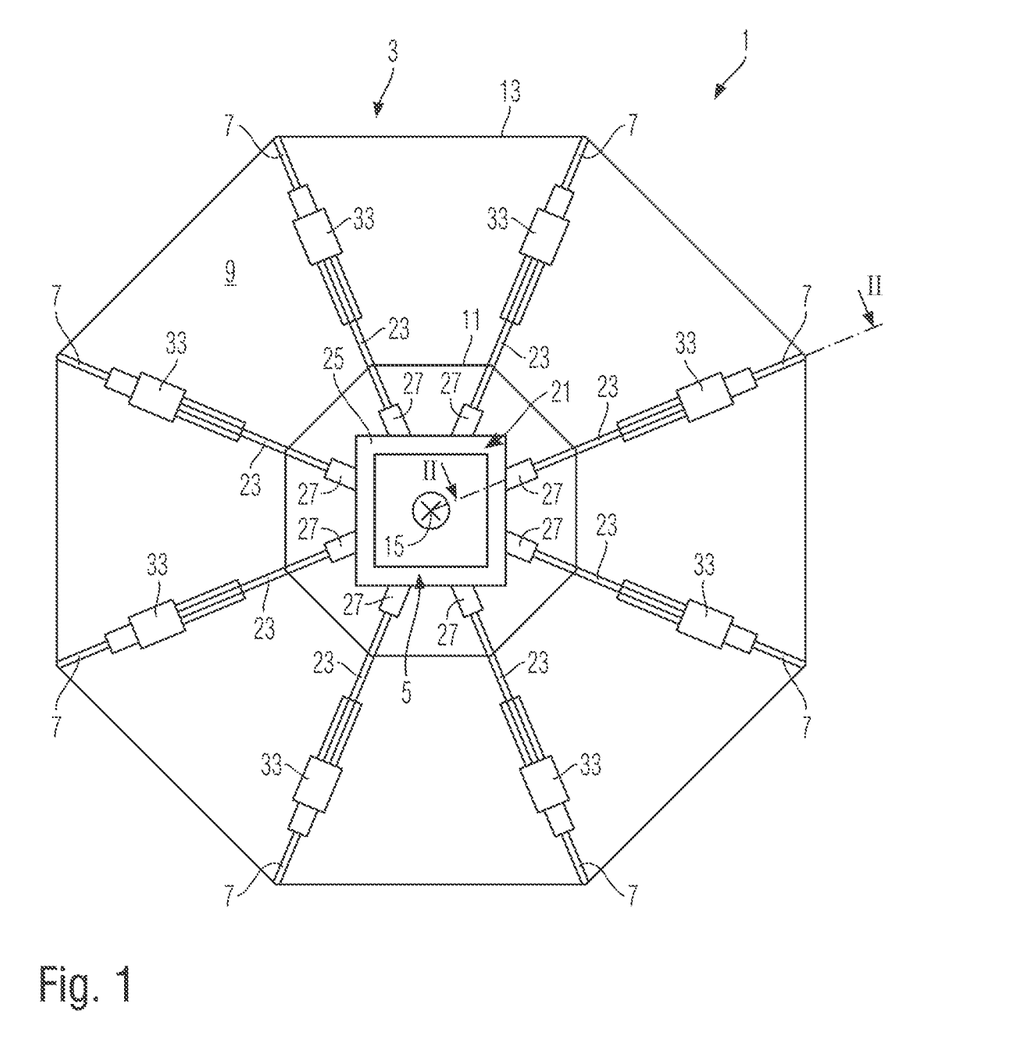
FIG. 1 shows a plan view of a lighting device according to an embodiment.
Figure 2:
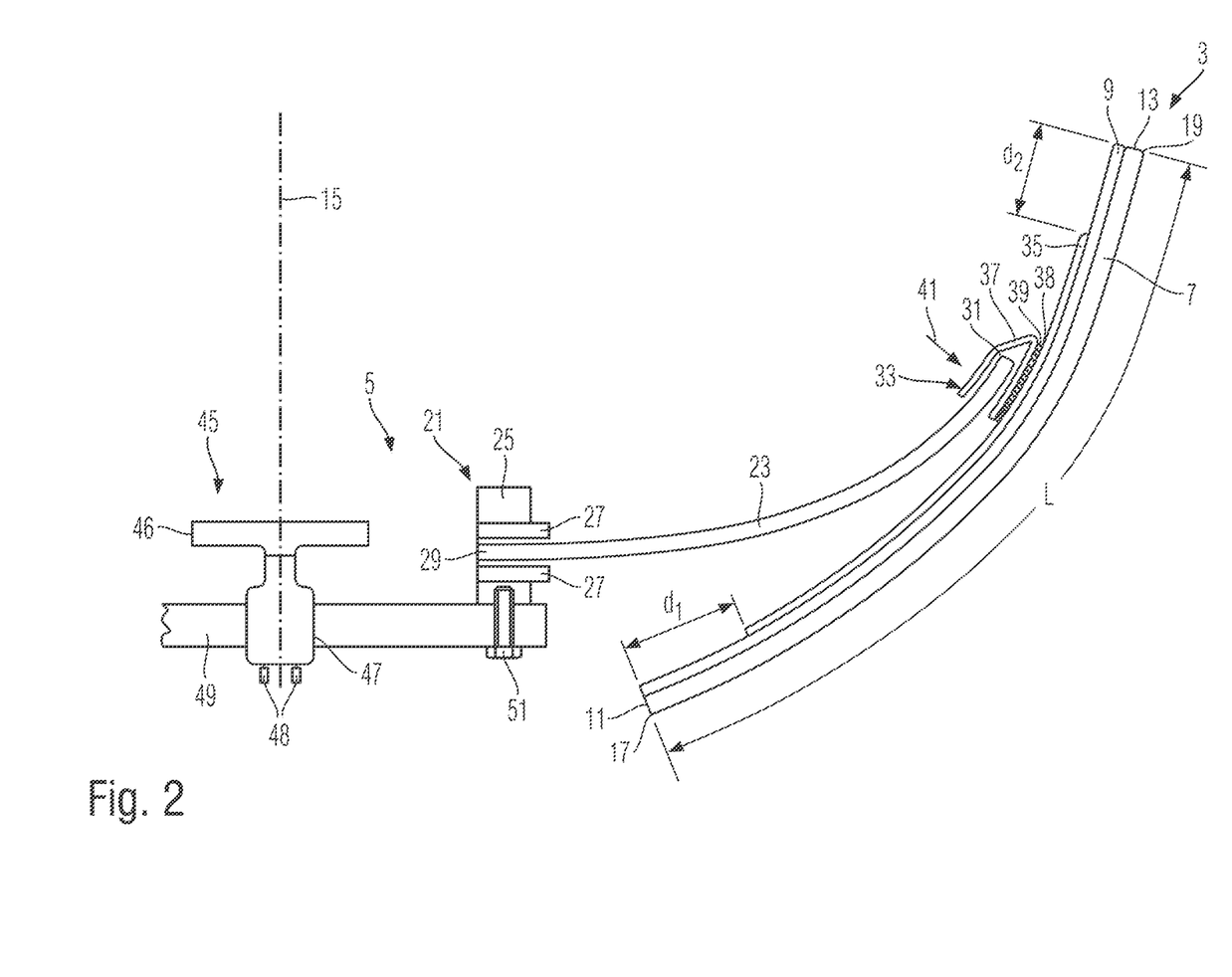
FIG. 2 is a sectional view of the lighting device shown in FIG. 1 along a line II-II shown in FIG. 1.

A lighting device according to a first embodiment will be illustrated with reference to FIGS. 1 and 2 below. FIG. 1 is a plan view of a lighting device 1 according to the first embodiment, and FIG. 2 is a sectional view of the lighting device 1 along a line II-II shown in FIG. 1.

The lighting device 1 is a softbox and comprises a funnel-shaped reflector 3 and a supporting structure 5. The funnel-shaped reflector 3 includes eight rods 7 and a flexible material 9 attached to the eight rods 7. The funnel-shaped reflector 3 has a proximal end 11 and a distal end 13. A main axis 15 can be assigned to the funnel-shaped reflector 3, wherein the main axis 15 is approximately an axis of symmetry of the funnel-shaped reflector. A circumference of the reflector about the axis 15 at the distal edge 13 is greater than a circumference of the reflector 3 around the axis 15 at the proximal edge 11. The reflector 3 can be made of any flat material, such as a textile material, or any material suitable for a conventional softbox. For example, the flat material can be black on the outer surface and white or reflective on the inner surface of the reflector 3. The rods can be made of any flexible material such as reinforced fiber materials.

The number of eight rods 7 is an exemplary number in this embodiment. A number of three, four, five, six or seven rods, or a number of nine or more rods can be used. In the section shown in FIG. 2, the rods 7 are attached to the outer surface of the funnel-shaped reflector 3. However, it is also possible that the rods 7 are attached to the inside of the funnel-shaped reflector 3, or the rods can be embedded within the funnel-shaped reflector 3 or attached to the funnel-shaped reflector 3 by any other suitable means.

The supporting structure 5 comprises a socket 21 and eight rods 23 attached to the socket 21. The socket 21 comprises a frame 25 having a rectangular shape in the plan view of FIG. 1, and eight sleeves 27 inserted into the frame 25. A first end 29 of each rod 23 is inserted into one of the sleeves 27 such that the first end 29 of the rod 23 is rigidly attached to the socket 21.

A second end 31 of the rod 23 is attached to a connector 33 configured to be attached to a connector 35 attached to the funnel-shaped reflector 3. The connector 33 provides a pocket 37 into which the second end 31 of the rod 23 is inserted. The pocket can be formed of, for example, a textile material adhered to the reflector 3 by sewing or by an adhesive.

The connector 33 further includes a hook portion 39 of a hook-and-loop-fastener. The connector 35 includes a loop portion 38 of this hook-and-loop-fastener such that the connector 33 can be connected to the connector 35 by bringing the hook portion 39 into contact with the loop portion 38 provided on the surface of the connector 35. By connecting the connector 33 to the connector 35, the supporting structure 5 is connected to the funnel-shaped reflector 3.

The connector 35 extends over a significant portion along a length L of the rod 7 of the funnel-shaped reflector 3. In the example illustrated in FIG. 2, the connector 35 extends over the full length L of the rod 7 except a portion of a length d1 at the proximal edge 11 of the funnel-shaped reflector 3 and a portion of a length d2 at the distal edge 13 of the funnel-shaped reflector 3. In particular, the length over which the connector 35 extends is equal to the length L of the rod 7 minus d1 minus d2. This length L−(d1+d2) is greater than 0.30 times L.

The connector 35 is located with a first distance as denoted by length d1 to the first end 17 of the rod 7. The first end 17 corresponds to the proximal edge 11 of the funnel-shaped reflector 3. According to the first embodiment as illustrated in FIG. 2, the first distance, namely the length d1 is configured to be greater than 0.05 times the length of one of the rods 7, in particular greater than 0.1 times the length of one of the rods 7, and in particular greater than 0.15 times the length of one of the rods 7.

On the other hand, the connector 35 is located with a second distance as denoted by length d2 to the second end 19 of the rod 7. The second end 19 corresponds to the distal edge 13 of the funnel-shaped reflector 3. According to the first embodiment as illustrated in FIG. 2, the second distance, namely the length d2 is configured to be greater than 0.05 times the length of one of the rods 7, in particular greater than 0.1 times the length of one of the rods 7, and in particular greater than 0.15 times the length of one of the rods 7.

By means of above mentioned configuration regarding the first and second distances d1 and d2, some materials of the connector 35 can be saved. More importantly, the connector 35 does not have to be located at either the first end or the second end of one of the rods 7, thereby enhancing the adaptability of the connection between the funnel-shaped reflector 3 and the corresponding supporting structure 5.

Due to the significant extension of the connector 35 along the rod 7 of the funnel-shaped reflector 3, it is possible to select a position in the longitudinal direction of the rod 7 where the connector 33 is attached to the connector 35. By suitably selecting this position where the connector 33 is attached to the connector 35, it is possible to generate a force indicated by an arrow 41 in FIG. 2 applied by the second end 31 of the rod 23 to the rod 7. Such force 41 is generated by each of the eight rods 23 distributed about the axis 15 such that these eight forces 41 support the funnel-shaped reflector 3 in its desired shape and prevent the reflector 3 from collapsing. Each of these forces 41 is generated by the elastic deformation of the rods 23. The rods 23 normally have a straight shape. Due to the selection of the positions where the connectors 33 are attached to the connectors 35, the rods 23 are bent to have a curved shape, and they generate the forces 41 trying to restore the rods 23 to their straight shape.

It the section of FIG. 2, it can be seen that the rod 23 approaches the rod 7 towards its distal edge 13. In other words, a distance between the rod 23 and the rod 7 decreases with the distance from the connector 33.

The supporting structure 5 is configured to support at least one light source. In the embodiment shown in FIGS. 1 and 2, one light source 45 is attached to the supporting structure 5. Specifically, the light source 45 is a LED light source having a light-emitting portion 46, a body portion 47 and electrical connectors 48. The light source 45 is supported at the supporting structure 5 via a plate 49 on which the light source 45 is mounted and which is fixed to the frame 25 of the socket 21 via screws 51.

More than one light source 45 can be mounted on the plate 49 and supported on the supporting structure 5. In some embodiments, 10 or 100 or more LED light sources 45 are mounted on the plate 49 and supported at the supporting structure 5. In some situations, a supporting structure 5 having a larger frame 25 can be used for accommodating a higher number of light sources 45. Such larger frame 25 results in positions of the sleeves 27 differing from the positions shown in FIGS. 1 and 2 for the first embodiment. However, since the position where the connectors 33 are connected to the connectors 35 can be selected by the user, supporting structures 5 having frames 25 of different sizes can be used together with a same funnel-shaped reflector 3.

Figure 3:
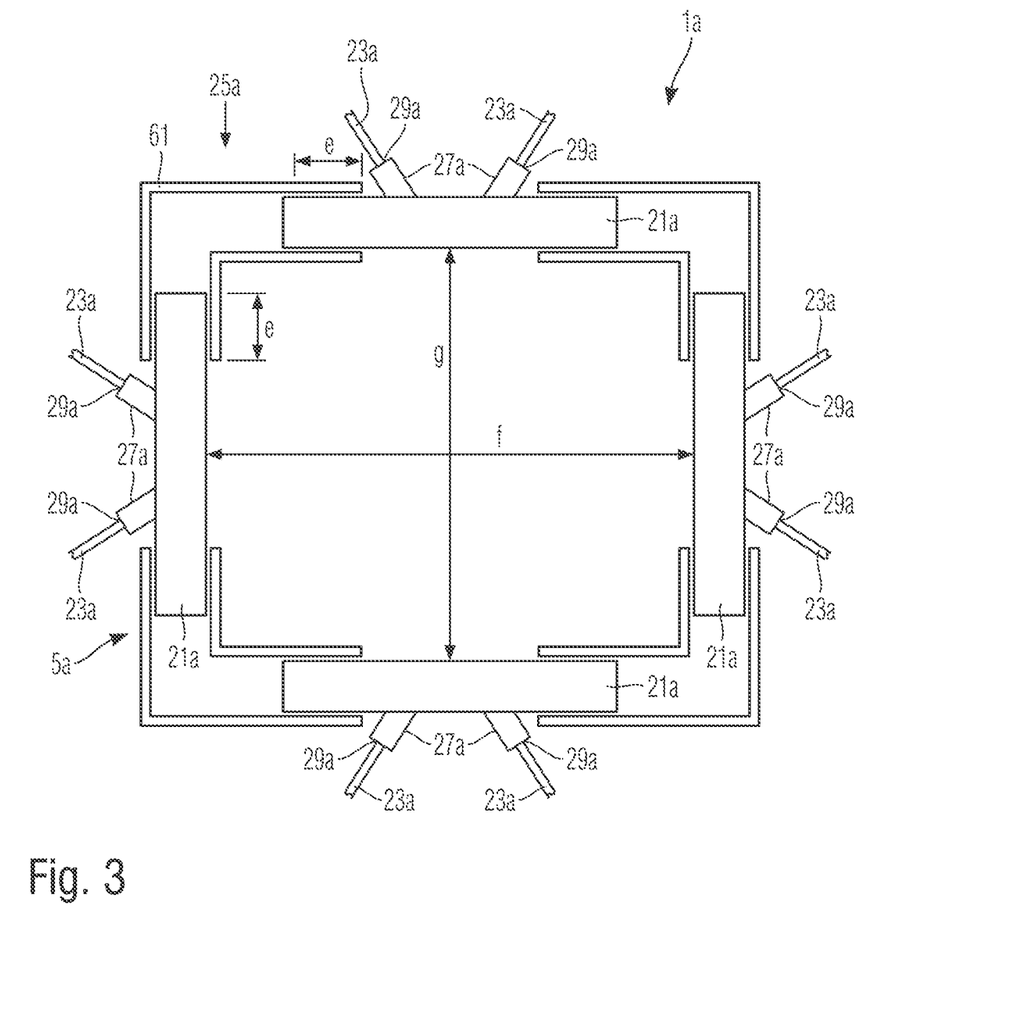
FIG. 3 is a plan view of a portion of a lighting device according to a fourth embodiment.

FIG. 3 is a plan view of a portion of a lighting device 1a according to a second embodiment. The lighting device 1a of the second embodiment has a configuration similar to the configuration of the lighting device 1 according to the first embodiment shown in FIGS. 1 and 2, wherein components of the lighting device 1a having a similar structure and function to the components of the lighting device 1 denoted by the same reference numerals but supplemented by the character "a". The second embodiment will be illustrated with reference to FIG. 3 below, mainly focusing on the illustration of components differing from the corresponding components of the first embodiment. The other components of the second embodiment similar to components of the first embodiment will not be further illustrated with reference to FIG. 3, and reference should be made to the description of the first embodiment and to the introductory portion of the specification for obtaining a full understanding of these components.

The lighting device 1a comprises a funnel-shaped reflector not further illustrated in FIG. 3, and a supporting structure 5a having four sockets 21a. Each socket 21a is provided with two sleeves 27a, into which ends of the rods of the supporting structure 5a are inserted into the sleeves 27a.

The sockets 21a are provided by elongated rectangular bars having ends inserted into edge elements 61 such that the four edge elements 61 and sockets 21a form a rectangular frame 25a. The sockets 21a can be inserted into the edge elements 61 by a depth e which can be selected by the user, wherein a position of the sockets 21a in the edge elements 61 can be fixed by screws (not shown in FIG. 3), for example. By appropriately selecting the depth e, it is possible to adjust distances f and g between pairs of sockets 21a. Accordingly, it is possible to adjust the size of the supporting structure 5a to a size necessary to attach a desired light source or an array of light sources to the supporting structure 5a. Again, due to the configuration of the connector 35 of the funnel-shaped reflector 9, it is possible to use a same funnel-shaped reflector 9 with the same supporting structure 5a adjusted to variable sizes f, g.

Figure 4:
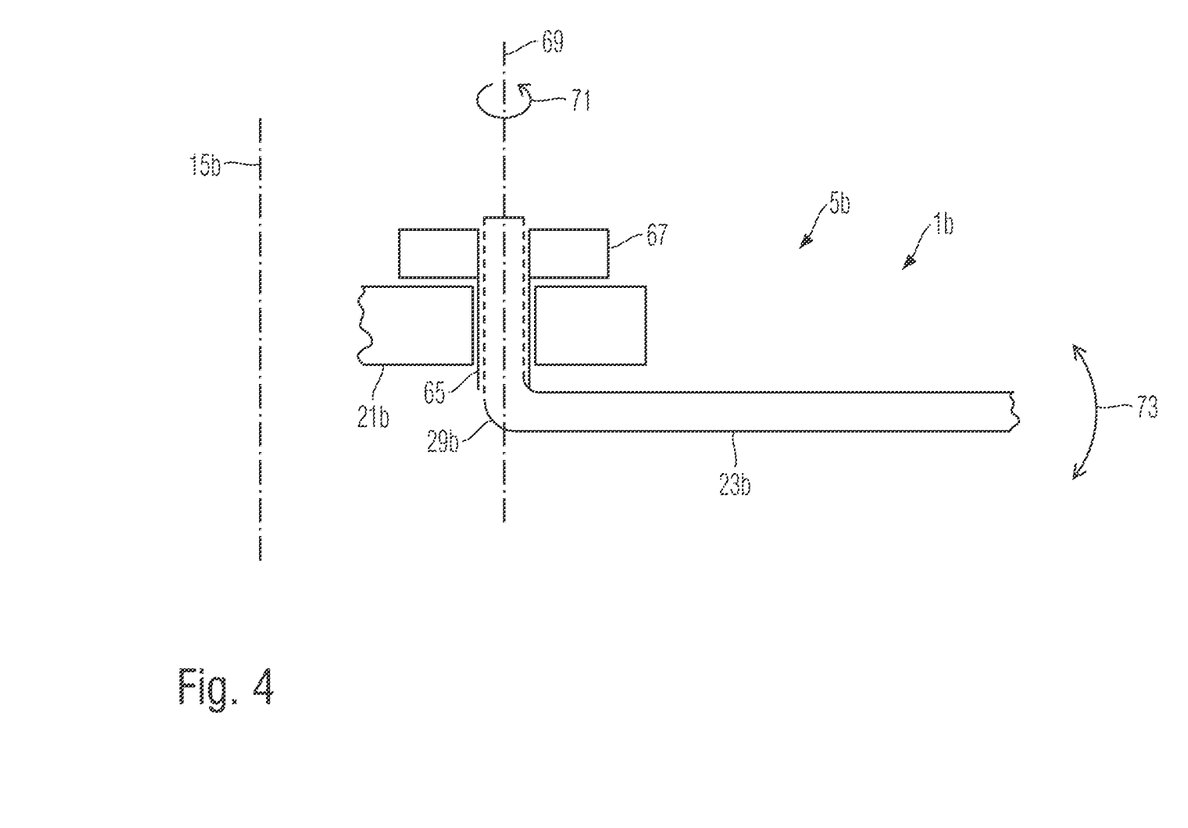
FIG. 4 is a sectional view illustrating a portion of a lighting device including a pivotable rod according to a second embodiment.

A third embodiment will be illustrated with reference to FIG. 4 below. FIG. 4 shows a sectional view of a portion of a lighting device 1b according to the third embodiment.

The lighting device 1b of the third embodiment has a configuration similar to the configuration of the lighting device 1 according to the first embodiment shown in FIGS. 1 and 2, wherein components of the lighting device 1b having a similar structure and function to the components of the lighting device 1 denoted by the same reference numerals but supplemented by the character "b". The third embodiment will be illustrated with reference to FIG. 4 below, mainly focusing on the illustration of components differing from the corresponding components of the first embodiment. The other components of the third embodiment similar to components of the first embodiment will not be further illustrated with reference to FIG. 4, and reference should be made to the description of the first and second embodiments and to the introductory portion of the specification for obtaining a full understanding of these components.

The lighting device 1b differs from the lighting devices 1 and 1a shown in FIGS. 1 to 3 above mainly in how rods 23b are attached to a socket 21b. In FIG. 4, end 29b of the rod 23b is bent by about 90° relative to a main portion of the rod 23b and inserted into a through-hole 65 provided in the socket 21b, wherein the end 29b of the rod 23b is secured in the through-hole 65 by a nut 67, for example. This configuration allows the rod 23 to be rotated about an axis 69 parallel to the central axis 15b of a funnel-shaped reflector, not shown in FIG. 4, as indicated by an arrow 71 in FIG. 4. However, this configuration does not allow substantial rotation in a direction indicated by an arrow 73 in FIG. 1. In other words, the rod 23b is blocked from pivoting in the direction 73 orthogonal to the circumferential direction 71 about the central axis 15b. This ensures that the rods 23b can be bent in order to generate forces (see arrow 41 in FIG. 2) for supporting the funnel-shaped reflector. However, the pivoting which is possible in the direction 71 about the axis 69 offers some degrees of freedom for attaching the other ends of the rods 23b to the connectors provided close to the rods of the funnel-shaped reflector when the size of the supporting structure 5*b* (see distance f, g in FIG. 3) is changed.

A fourth embodiment will be illustrated with reference to FIG. 5 below. The lighting device 1*c* of the fourth embodiment has a configuration similar to the configuration of the lighting device 1 according to the first embodiment shown in FIGS. 1 and 2, wherein components of the lighting device 1*c* having a similar structure and function to the components of the lighting device 1 denoted by the same reference numerals but supplemented by the character "c". The fourth embodiment will be illustrated with reference to FIG. 5 below, mainly focusing on the illustration of components differing from the corresponding components of the first embodiment. The other components of the fourth embodiment similar to components of the first embodiment will not be further illustrated with reference to FIG. 5, and reference should be made to the description of the first, second and third embodiments and to the introductory portion of the specification for obtaining a full understanding of these components.

Figure 5:
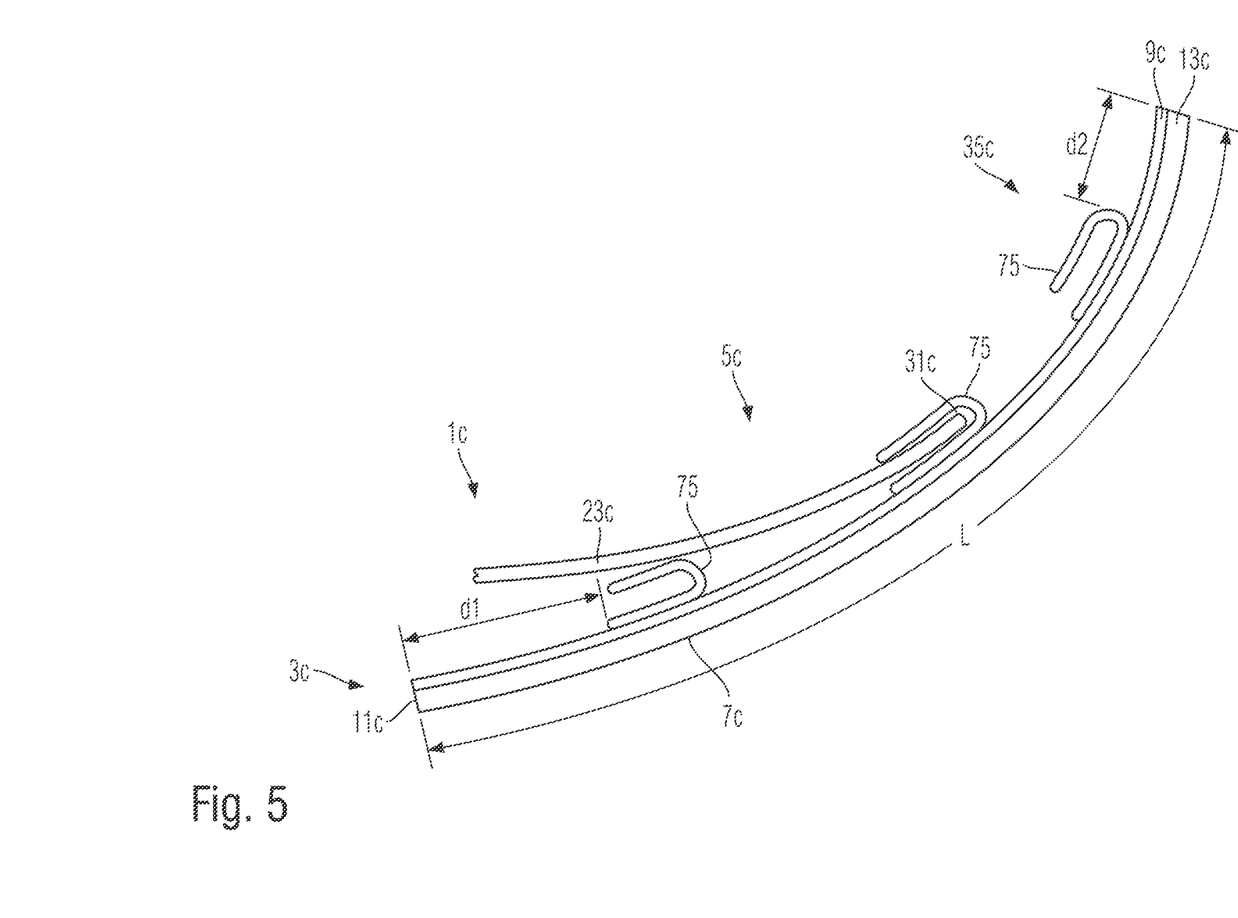
FIG. 5 is a sectional view corresponding to FIG. 2 of a lighting device according to a third embodiment.

FIG. 5 is a sectional view of a portion of a lighting device 1*c* similar to the sectional view of FIG. 2. The lighting device 1*c* differs from the lighting device 1 illustrated in FIGS. 1 and 2 mainly in the configuration of the connection between second ends 31*c* of rods 23*c* of a supporting structure 5*c* to a connector 35*c* attached to a funnel-shaped reflector 3*c*.

The connection between the rods 23*c* and the funnel-shaped reflector 3*c* is not provided by a hook-and-loop-fastener in the embodiment shown in FIG. 5. Specifically, the connector 35*c* comprises a plurality of pockets 75 distributed along a portion of rods 7*c* of the funnel-shaped reflector 3*c*. The portion having the pockets 75 extends along a length L and of the rod 7*c* except a portion having a length d1 at a peripheral edge 11*c* of the funnel-shaped reflector 3*c* and a portion having a length d2 at the distal end 13*c* of the funnel-shaped reflector 3*c*.

The plurality of pockets 75 offers a plurality of positions along the length L of the rod 7*c* where the end 31*c* of the road 23*c* can be connected to the funnel-shaped reflector 3*c*, such that a same funnel-shaped reflector 3*c* can be used with supporting structures 5*c* of differing sizes.

The length over which the connector 35*c* extends is equal to the length L of the rod 7*c* minus d1 minus d2. In the embodiments, this length L−(d1+d2)>0.30×L.

Figure 6:
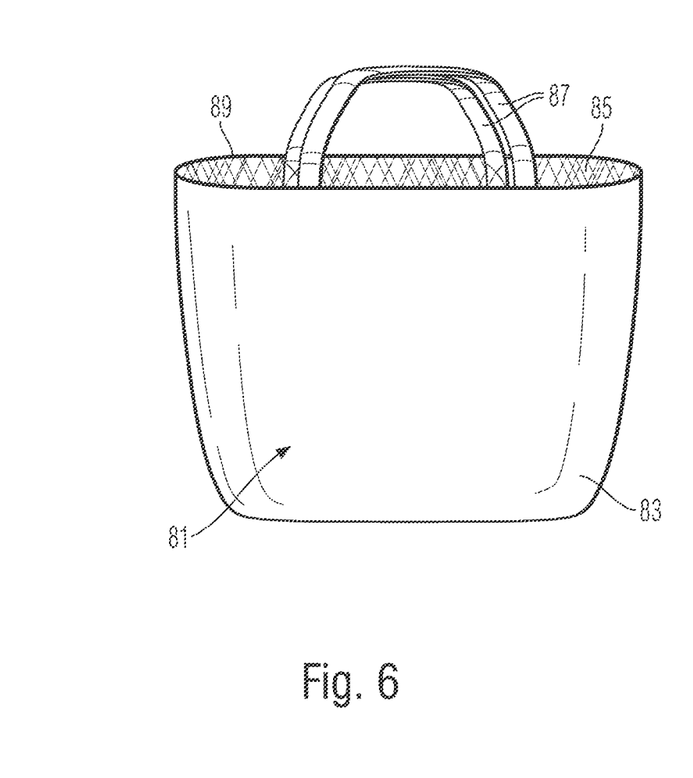
FIG. 6 is a front view of a portable bag for storage and transportation of a folded reflector and a supporting structure.

FIG. 6 is a front view of a portable bag 81 for storage and transportation of a folded funnel-shaped reflector 3 and a supporting structure 5. The portable bag 81 is composed of a quasi-rectangular bag body denoted by 83, which is made of lightweight material, such as polyester. There is one opening portion 85 of the bag body 83. The opening portion 85 is configured to be large enough, so that the folded funnel-shaped reflector 3 and the supporting structure 5 which includes at least one socket 21 and a plurality of second rods 23 can be inserted into the bag body 83 without any difficulty. The opening portion 85 is provided with a locking mechanism 89 in order to close the opening portion 85 during the transportation. The locking mechanism 89 can be a zip or a hook-and-loop-fastener. A pair of handles are attached near the opening portion 85 of the portable bag 81 in order to facilitate the transportation of the lighting device.

After the lighting device has been transported to the target location such as film or photography locations, the folded reflector 3 and a supporting structure 5 including at least one socket 21 and a plurality of second rods 23 are first of all extracted from the portable bag 81. The folded reflector 3 is then spanned to a funnel-shaped reflector 3 as illustrated in FIG. 1. Thereafter, a first end 29 of each of the plurality of second rods 23 is attached to the at least one socket 21 by means of a corresponding sleeve 27. A second end 31 of each of the plurality of second rods 23 is attached to one of the first connectors 35.

According to one embodiment, each of the first connectors 35 comprises a plurality of pockets 75 which are distributed along at least one portion of one of the plurality of first rods 7, so that the second end 31 of each of the plurality of second rods 23 can be inserted into one of the plurality of pockets 75 according to the length of each of the plurality of second rods 23 and the size of the at least one socket 21.

According to a further embodiment, each of the first connectors 35 comprises a hook portion 39 or a look portion 38 of a hook-and-look-fastener. In case that each of the first connectors 35 comprises a hook portion 39, the complementary loop portion 38 is attached at the second end 31 of each of the plurality of second rods 23. In case that each of the first connectors 35 comprises a loop portion 38, the complementary hook portion 39 is attached at the second end 31 of each of the plurality of second rods 23.

After each of the second end 31 of the plurality of second rods 23 is attached to each of the first connectors 35, the at least one light source can be operated. Thereafter, the second end 31 of each of the plurality of second rods 23 can be released from the corresponding one of the plurality of first connectors 35 and the first end 29 of each of the plurality of second rods 23 can be released from the corresponding sleeve 27 of the at least one socket.

At this stage, the reflector 3, the plurality of second rods 23 and the at least one socket 21 are disconnected from one another. Then, the funnel-shaped reflector 3 can be conveniently folded into a trapezoid collapsed form as illustrated in FIG. 6 with the reference sign 3.

Finally, the folded reflector 3, the plurality of second rods 23 and the at least one socket 21 can be inserted into the portable bag 81 for storage and transportation.

The invention claimed is:

1. A lighting device, comprising:
   a funnel-shaped reflector, the funnel-shaped reflector comprising:
   a plurality of first rods,
   a flexible material attached to the plurality of first rods, and
   a plurality of first connectors, wherein each of the plurality of first connectors is attached to the reflector at a position adjacent to one of the plurality of first rods; and
   a supporting structure configured to support at least one light source, the supporting structure comprising:
   at least one socket, and
   a plurality of second rods,
   wherein each of the plurality of second rods has a first end and a second end;
   wherein the first end of each of the plurality of second rods is attached to the at least one socket; and
   wherein the second end of each of the plurality of second rods is releasably connected to a corresponding one of the first connectors;
   wherein a position where the second end of the second rod is connected to the first connector is adjustable in a direction of extension of the first rod; and wherein each of the first connectors extends along the corresponding one of the first rods over a length greater than 0.3 times a length of the corresponding one of the first rods.

2. The lighting device according to claim 1,
wherein the supporting structure has a central axis;
wherein each of the plurality of second rods extend away from the central axis; and
wherein the second ends of the plurality of second rods are distributed around the central axis.

3. The lighting device according to claim 1,
wherein the supporting structure comprises a plurality of sockets; and
wherein the supporting structure has a variable size such that distances between pairs of the plural sockets are adjustable.

4. The lighting device according to claim 1,
wherein the supporting structure includes at least one second connector attached to the second end of one of the second rods,
wherein the second connector is configured to connect to one of the first connectors.

5. The lighting device according to claim 1,
wherein the reflector has a proximal edge and a distal edge;
wherein a circumference of the reflector at the distal edge is greater than a circumference of the reflector at the proximal edge; and
wherein each of the plurality of first rods extends from the proximal edge of the reflector to the distal edge of the reflector.

6. The lighting device according to claim 1,
wherein each of the first connectors is located with a first distance to the first end of each of the first rods, wherein the first distance is greater than 0.05 times the length of one of the first rods.

7. The lighting device according to claim 1,
wherein each of the first connectors is located with a second distance to the second end of each of the first rods, wherein the second distance is greater than 0.05 times the length of one of the first rods.

8. The lighting device according to claim 1, wherein at least one of the first connectors extends along the one of the first rods over a length greater than 0.45 times a length of the one of the first rods.

9. The lighting device according to claim 1, wherein at least one of the first connectors extends along the one of the first rods over a length greater than 0.60 times a length of the one of the first rods.

10. The lighting device according to claim 1, wherein each of the first connectors is located with a first distance to the first end of each of the first rods, wherein the first distance is greater than 0.1 times the length of one of the first rods.

11. The lighting device according to claim 1, wherein each of the first connectors is located with a first distance to the first end of each of the first rods, wherein the first distance is greater than 0.15 times the length of one of the first rods.

12. The lighting device according to claim 1, wherein each of the first connectors is located with a second distance to the second end of each of the first rods, wherein the second distance is greater than 0.1 times the length of one of the first rods.

13. The lighting device according to claim 1, wherein each of the first connectors is located with a second distance to the second end of each of the first rods, wherein the second distance is greater than 0.15 times the length of one of the first rods.

14. A lighting device comprising:
a funnel-shaped reflector, the funnel-shaped reflector comprising:
a plurality of first rods,
a flexible material attached to the plurality of first rods, and
a plurality of first connectors, wherein each of the plurality of first connectors is attached to the reflector at a position adjacent to one of the plurality of first rods; and
a supporting structure configured to support at least one light source, the supporting structure comprising:
at least one socket, and
a plurality of second rods,
wherein each of the plurality of second rods has a first end and a second end;
wherein the first end of each of the plurality of second rods is attached to the at least one socket;
wherein the second end of each of the plurality of second rods is releasably connected to a corresponding one of the first connectors;
wherein a position where the second end of the second rod is connected to the first connector is adjustable in a direction of extension of the first rod;
wherein the supporting structure has a central axis;
wherein each of the plurality of second rods extend away from the central axis;
wherein the second ends of the plurality of second rods are distributed around the central axis;
wherein the second ends of the plurality of second rods are distributed around the central axis;
wherein the plurality of the second rods includes at least one pivotable rod, and
wherein the first end of the at least one pivotable rod is hinged to the at least one socket such that the pivotable rod is pivotable relative to the at least one socket in a circumferential direction about the central axis.

15. The lighting device according to claim 14,
wherein pivoting in a direction orthogonal to the circumferential direction about the central axis of the pivotable rod is blocked.

16. A lighting device comprising:
a funnel-shaped reflector, the funnel-shaped reflector comprising:
a plurality of first rods,
a flexible material attached to the plurality of first rods, and
a plurality of first connectors, wherein each of the plurality of first connectors is attached to the reflector at a position adjacent to one of the plurality of first rods; and
a supporting structure configured to support at least one light source, the supporting structure comprising:
at least one socket, and
a plurality of second rods,
wherein each of the plurality of second rods has a first end and a second end;
wherein the first end of each of the plurality of second rods is attached to the at least one socket;
wherein the second end of each of the plurality of second rods is releasably connected to a corresponding one of the first connectors;

wherein a position where the second end of the second rod is connected to the first connector is adjustable in a direction of extension of the first rod;

wherein the plurality of second rods are elastically deformed to apply a supporting force to the plurality of first rods of the funnel-shaped reflector; and wherein the supporting force prevents the reflector from collapsing.

17. The lighting device according to claim 16, wherein at least one of the first connectors extends along the one of the first rods over a length greater than 0.30 times a length of the one of the first rods.

18. A lighting device comprising:

a funnel-shaped reflector, the funnel-shaped reflector comprising:
   a plurality of first rods,
   a flexible material attached to the plurality of first rods, and
   a plurality of first connectors, wherein each of the plurality of first connectors is attached to the reflector at a position adjacent to one of the plurality of first rods; and a supporting structure configured to support at least one light source, the supporting structure comprising:
   at least one socket, and
   a plurality of second rods, wherein each of the plurality of second rods has a first end and a second end;

wherein the first end of each of the plurality of second rods is attached to the at least one socket;

wherein the second end of each of the plurality of second rods is releasably connected to a corresponding one of the first connectors;

wherein a position where the second end of the second rod is connected to the first connector is adjustable in a direction of extension of the first rod;

wherein at least one of the plurality of first connectors comprises a plurality of pockets distributed along at least a portion of one of the first rods; and wherein the second end of one of the plurality of second rods is inserted into one of the plurality of the pockets.

19. A lighting device comprising:

a funnel-shaped reflector, the funnel-shaped reflector comprising:
   a plurality of first rods,
   a flexible material attached to the plurality of first rods, and
   a plurality of first connectors, wherein each of the plurality of first connectors is attached to the reflector at a position adjacent to one of the plurality of first rods; and a supporting structure configured to support at least one light source, the supporting structure comprising:
   at least one socket, and
   a plurality of second rods, wherein each of the plurality of second rods has a first end and a second end;

wherein the first end of each of the plurality of second rods is attached to the at least one socket;

wherein the second end of each of the plurality of second rods is releasably connected to a corresponding one of the first connectors;

wherein a position where the second end of the second rod is connected to the first connector is adjustable in a direction of extension of the first rod;

wherein the supporting structure includes at least one second connector attached to the second end of one of the second rods, wherein the second connector is configured to connect to one of the first connectors;

wherein the first connector is a hook portion of a hook-and-loop-fastener and the second connector is a loop portion of the hook-and-loop-fastener; or wherein the first connector is a loop portion of a hook-and-loop-fastener and the second connector is a hook portion of the hook-and-loop-fastener.

* * * * *